United States Patent [19]

Smith

[11] 4,337,374

[45] Jun. 29, 1982

[54] SERVICE WIRE SPLICE ENCLOSURE

[75] Inventor: Donald J. Smith, Woodland Hills, Calif.

[73] Assignee: Communications Technology Corporation, Los Angeles, Calif.

[21] Appl. No.: 228,242

[22] Filed: Jan. 26, 1981

[51] Int. Cl.³ .......................................... H02G 15/00
[52] U.S. Cl. .................................. 174/138 F; 174/87; 339/116 C; 339/208
[58] Field of Search ............ 174/87, 76, 74 A, 138 F, 174/885; 339/36, 103 M, 107, 116 C, 208

[56] References Cited

U.S. PATENT DOCUMENTS

| | | | |
|---|---|---|---|
| 654,703 | 7/1900 | Bassett | 174/87 |
| 3,335,394 | 8/1967 | Miller | 339/208 X |
| 3,573,714 | 4/1971 | Turner | 339/107 |
| 3,683,314 | 8/1972 | Elkins | 174/92 X |
| 3,879,575 | 4/1975 | Dobbin | |
| 4,176,245 | 11/1979 | Merlack | |

*Primary Examiner*—Roy N. Envall, Jr.

[57] ABSTRACT

An enclosure for an electric cable splice suitable for burial in the ground. An enclosure which provides moisture-proofing and mechanical protection for the splice. A pair of shells which slide together to form a box-like enclosure having a main compartment, an intermediate compartment, and an entrance passage. A pair of cables is positioned in the entrance passage with the cables passing through the intermediate compartment into the main compartment where the splices of pairs of conductors are located. Each of the shells has a quantity of sealant in the main section so that when the two sections are brought together with the cable splice there between, the splice components are completely surrounded by the sealant in the main compartment, and sealant is forced into the intermediate compartment around the cables.

14 Claims, 8 Drawing Figures

U.S. Patent   Jun. 29, 1982   Sheet 1 of 2   4,337,374
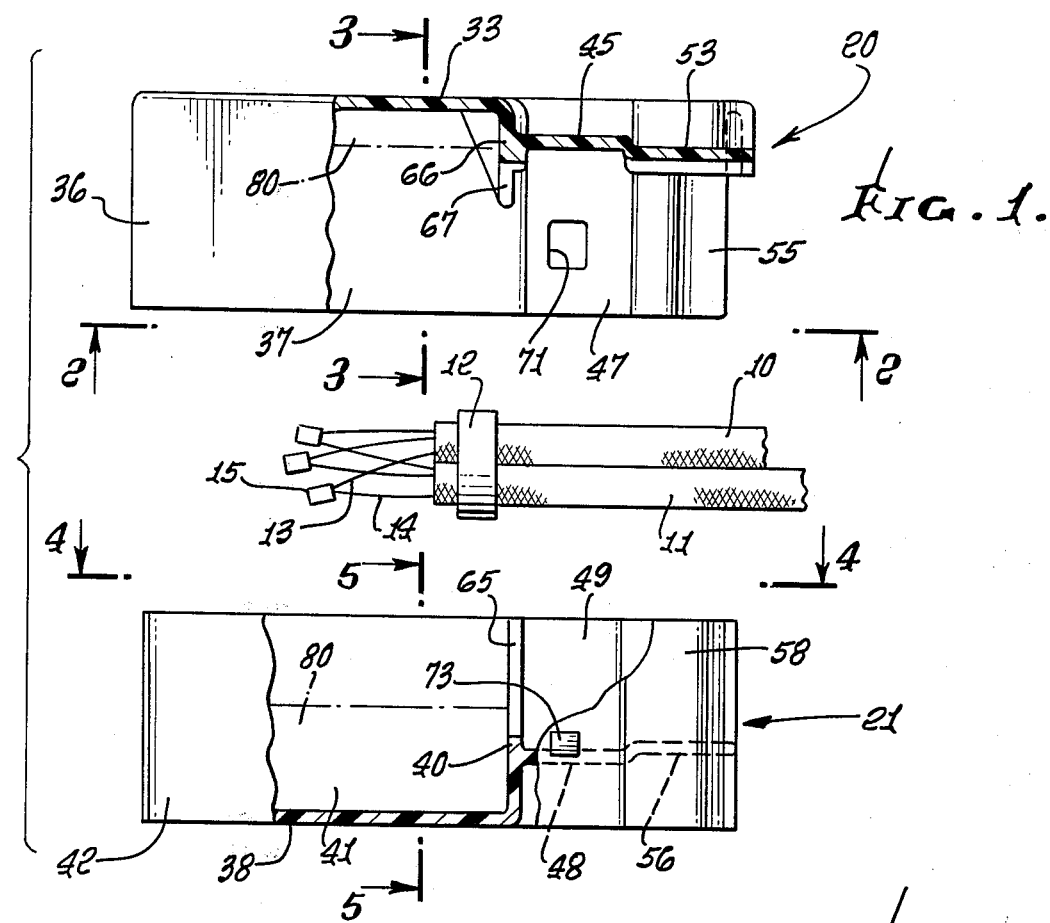
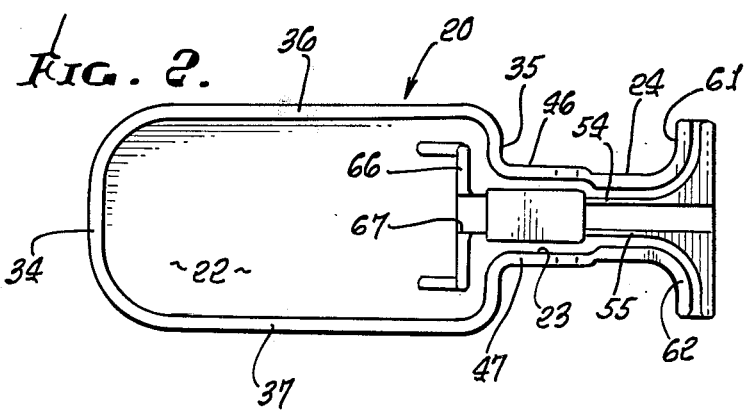
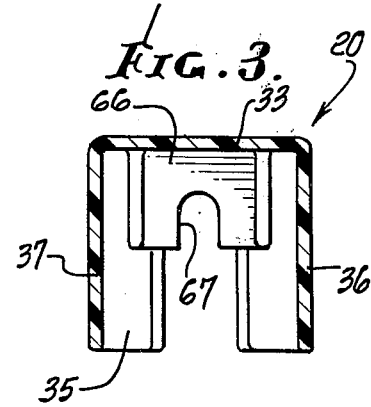
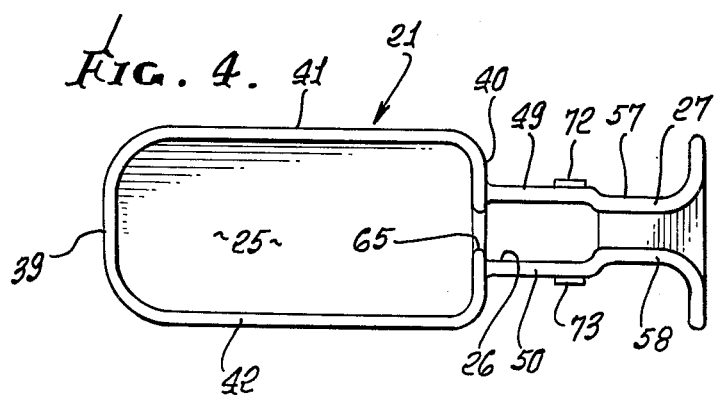
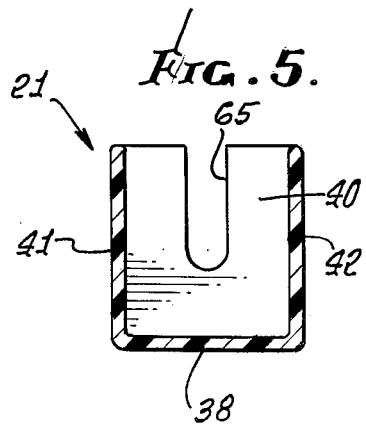

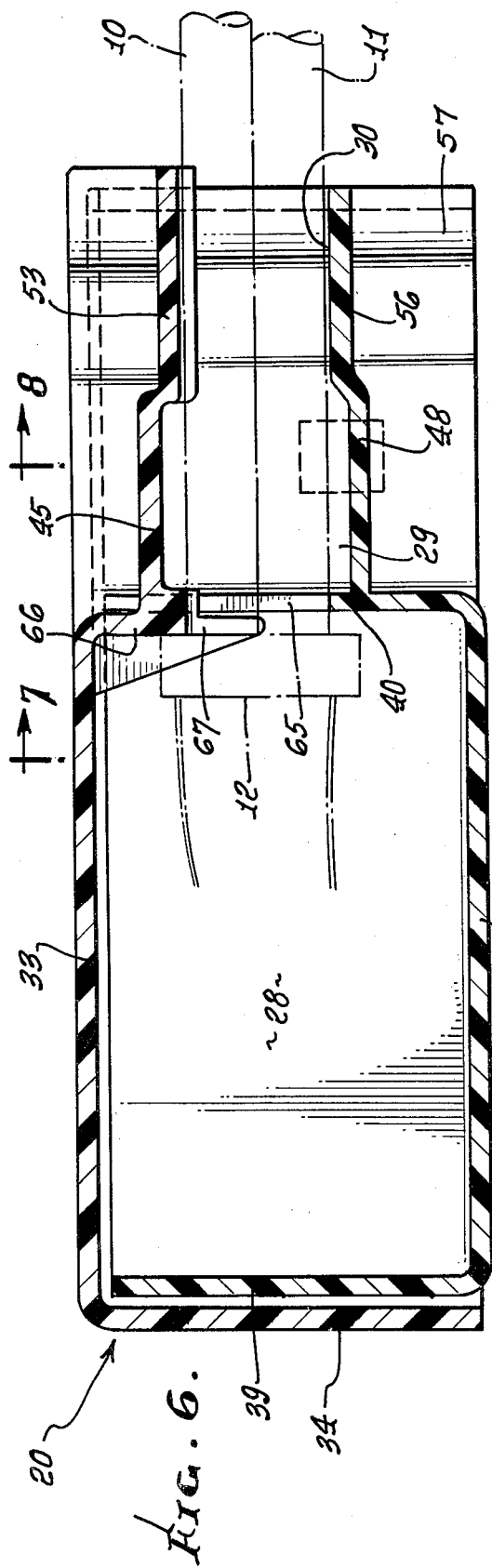
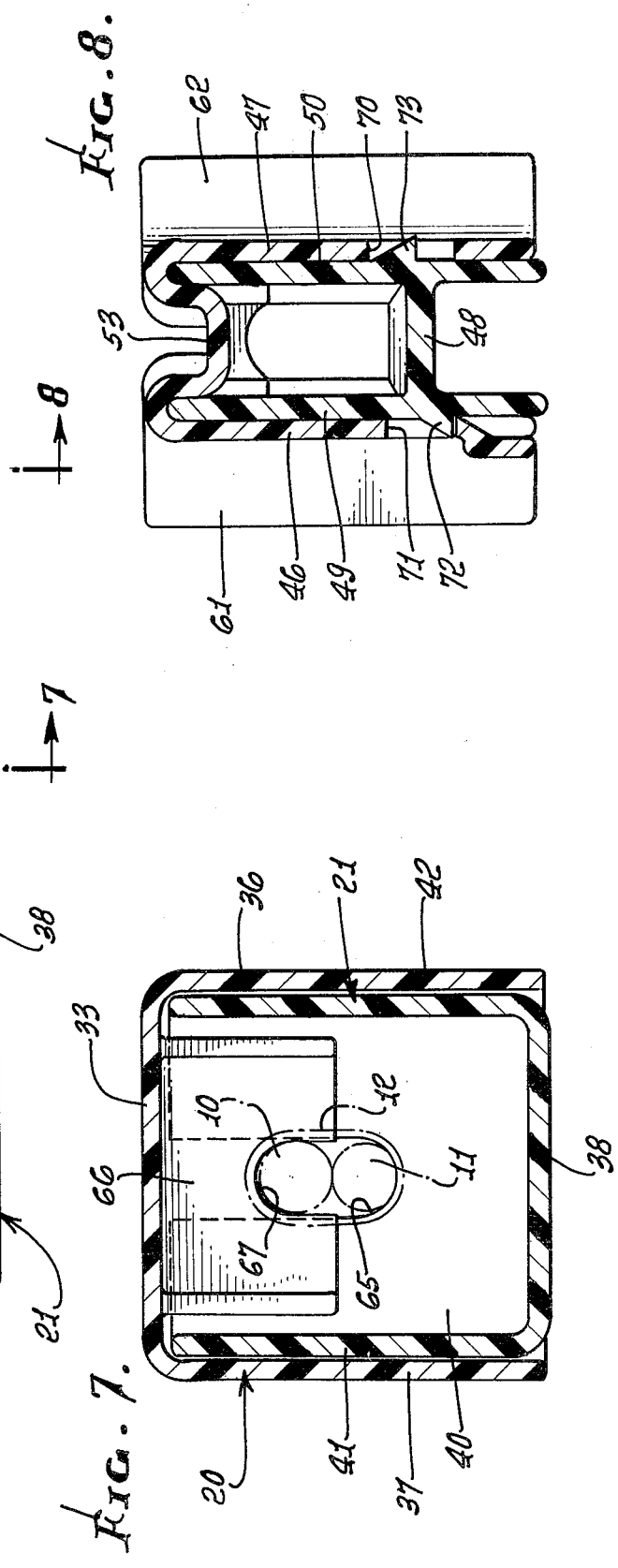

SERVICE WIRE SPLICE ENCLOSURE

BACKGROUND OF THE INVENTION

This invention relates to enclosures for splices in electrical cables and, in particular, to a new and improved enclosure for a cable splice suitable for burying in the ground and protecting the splice from moisture and mechanical damage.

Electric cables such as telephone cables and power cables are interconnected by joining or splicing the individual conductors of the two cables. Since the integrity of the cable is breached at the end exposing the conductors for the splices, it is desirable to provide some type of electrical insulation and mechanical protection for the splices and cable ends. This is particularly so where the cables are buried under ground and the splice will be buried after completion.

One such enclosure in widespread use today is shown in U.S. Pat. Nos. 3,934,076 and 4,053,704. In using this unit, the two cables are positioned parallel to each other with the exposed conductors side by side. The electrical interconnections are made between individual conductors of appropriate pairs. A plug is positioned around the cables spaced from the splice end of the cables. The splice end is then inserted into a vial through the open end, with the plug providing an enclosure for this open end. The vial contains a quantity of sealant, typically an insulating grease. The insertion of the splice into the vial tends to immerse the splice in the grease to provide moisture proofing.

While this prior art enclosure was an improvement over earlier used devices, it does suffer a number of disadvantages. When the spliced cables are pushed into the vial, there is no assurance that the sealant moves into all of the spaces around the splices and cables and no assurance that the splices are centrally positioned within the vial. Also, problems with collapsing and rupture of the vial have been encountered with buried installations, particularly in rocky terrain. Another problem is with the lateral pull or strain on the cables at the point where they exit the enclosure when the cables lead off in opposite directions.

It is an object of the present invention to provide a new and improved enclosure for cable splices which is rugged, strong and durable and less susceptible to damage than prior units. Another object is to provide such an enclosure wherein the splice is laid into the sealant rather than being pushed into the sealant, so that one can be assured that the splice is completely penetrated and surrounded by the sealant.

It is a particular object of the invention to provide a new and improved enclosure having a multi-compartment configuration with provision for centering the splice within the main compartment containing the sealant. A further object is to provide such an enclosure incorporating an intermediate compartment with the cables spaced from the walls of the compartment providing a zone for receiving sealant forced out of the main compartment to further enclose the cable. An additional object of the invention is to provide such an enclosure which incorporates mechanical stops to prevent pulling of the cables from the enclosure and which incorporates continuous curves at the entrance for protecting the cables. Another object of the invention is to provide a positive latching feature which also is an aural and visual indicator of complete engagement.

These and other objects, advantages, features and results will more fully appear in the course of the following description.

SUMMARY OF THE INVENTION

The enclosure for the electric cable splice includes first and second generally rectangular shells, each having a main section, an intermediate section and an entrance section, with one of the shells sliding over the other bringing the main sections together to form a main compartment and the intermediate sections together to form an intermediate compartment and the entrance sections together to form an entrance passage. A body of sealant, typically an insulating grease, is provided in each of the main sections with the splice or splices being laid into the sealant so that the splices are enclosed in sealant when the two shells are brought together.

In the preferred embodiment, the entrance passage has a cross-sectional area for receiving a pair of cables, the intermediate compartment has a larger cross-sectional area, and the main compartment has a further larger cross-sectional area. Barrier members are provided in the shells, incorporating slots to define an interior passage between the main and intermediate compartments, with the interior and entrance passages in alignment and providing for positioning the pair of cables centrally located within the enclosure. The interior barrier members also serve as mechanical stops for preventing withdrawal of the splice from the enclosure.

Also in the preferred embodiment, the shells are provided with inter-engaging elements for locking the shells together, preferably in either of two positions, and with continuously curved surfaces at the entrance passage for relieving strain on the cables.

BRIEF DESCRIPTION OF THE DRAWINGS

FIG. 1 is a side view, partly in section, showing two shells of an enclosure with spliced cables there between, and incorporating the presently preferred embodiment of the invention;

FIG. 2 is a view taken along the line 2—2 of FIG. 1;

FIG. 3 is a sectional view taken along the line 3—3 of FIG. 1;

FIG. 4 is a view taken along the line 4—4 of FIG. 1;

FIG. 5 is a sectional view taken along the line 5—5 of FIG. 1;

FIG. 6 is an enlarged view of the enclosure of FIG. 1 with the two shells joined together;

FIG. 7 is a sectional view taken along the line 7—7 of FIG. 6; and

FIG. 8 is a sectional view taken along the line 8—8 of FIG. 6.

DESCRIPTION OF THE PREFERRED EMBODIMENT

The enclosure of the invention is illustrated in the drawings as used in enclosing the spliced cables 10, 11. A portion of the outer sheaths of each cable is removed, exposing individual conductors. The cables are positioned side by side with the exposed conductors adjacent each other, and the two cables preferably are joined together by a band 12 which typically is a metal strap crimped about the two cables or a U-connector with a threaded nut. The conductors of the cables are connected by conventional means, such as by removing insulation from the ends of conductors 13, 14 and joining the ends by a crimp-type connector 15.

The enclosure includes an outer shell 20 and an inner shell 21. The shells are generally rectangular in shape, with the outer shell 20 sliding over the inner shell 21 as shown in FIGS. 6-8. The shell 20 has a main section 22, an intermediate section 23, and an entrance section 24. The shell 21 has a main section 25, an intermediate section 26, and an entrance section 27. When the outer shell 20 is slid over the inner shell 21, these sections form a main compartment 28, an intermediate compartment 29, and an entrance passage 30.

The main section 22 of the outer shell 20 is formed by top 33, ends 34, 35, and sides 36, 37. The main section 25 of the lower shell 21 is similarly formed with a bottom 38, ends 39, 40, and sides 41, 42. The intermediate section 23 of the outer shell 20 is formed with a top 45 and sides 46, 47, and the intermediate section 26 of the inner shell 21 is formed with a bottom 48 and sides 49, 50. The entrance section 24 of the outer shell 20 is formed with a top 53 and sides 54, 55, and the entrance section of the inner shell 21 is formed with a bottom 56 and sides 57, 58.

The outer shell 20 also has wall sections 61, 62 which are spaced from sides 54, 55, respectively, defining grooves which receive the inner shell sides 58, 57, respectively, when the two shells are brought together as shown in FIGS. 6-8. The sides 54, 55 of the shell 20 and the sides 57, 58 of the shell 21 preferably flare outward in continuous curves, as seen in FIGS. 2 and 4.

A slot 65 is provided in the end 40 of the inner shell 21, as best seen in FIGS. 4 and 5. A baffle or barrier 66 is provided in the main section 22 of the outer shell 20. The baffle 66 is spaced from the end 35, providing a space for sliding the receiving end 40 of the inner shell 21. A slot 67 is formed in the baffle 66, as best seen in FIGS. 2 and 3.

Inter-engaging means are provided on the shells for latching the shells together and preferably comprise openings 70, 71 in the sides 46, 47, respectively, of the intermediate section 23 of the outer shell 20, and wedge-shaped bosses 72, 73 in the sides 49,50, respectively, of the intermediate section 26 of the inner shell 21.

The projecting bosses 72, 73 preferably are vertically offset from each other, as shown in FIG. 8. When the two shells are brought together, the boss 73 first enters the opening 70, latching the shells at a first position. If it is desired to have the shells closer together, they are moved toward each other further, bringing the boss 72 into the opening 71. The shells preferably are of molded plastic construction, each shell being a unitary molding. The shells desirably are made sufficiently flexible so that the sides can be moved away from each other to release the bosses from the openings, permitting disassembly of the shells when desired.

A quantity of sealant 80 is positioned in the main section of each of the shells. The sealant may be a conventional product and typically is a silicone grease having good electrical insulating properties and not miscible with water. Also, the sealant should be of a gel or grease-like consistency and be a material which does not set up but rather stays flowable during the normal life expectancy of the splice.

In the preferred embodiment, the entrance sections of the shells which form the entrance passage are dimensioned so that the cables 10, 11 fit snugly in the entrance passage. When the two shells are brought together, the slots 65, 67 form an interior passage which also should be of a size for snugly fitting around the cables 10, 11. The intermediate sections 23, 26 are dimensioned so that the intermediate compartment 29 is larger than the cables 10, 11, providing a clearance space all around the cables, as best seen in FIGS. 6 and 7. With this configuration, the entrance passage and the interior passage maintain the cables centrally positioned within the enclosure, with the cables spaced from all the walls of the intermediate compartment. This configuration also serves to position the splices of the conductor pairs within the central portion of the main compartment.

Preferably, the total volume of sealant placed in the main section of the two shells is greater than the volume of the resulting main compartment with the spliced cables thereon. In use, the spliced cables are positioned in the lower shell, with the band 12 in the main section. The workman can visually observe that the conductors and connections of the cables are centrally positioned within the main section. Then the outer shell is placed over the inner shell to bring the desired boss 72, 73 into the desired opening. When the outer shell is pushed onto the inner shell, the excess sealant is forced from the main compartment into the intermediate compartment providing additional moisture proofing all around the two cables. This completes the making of the enclosed splice, and the enclosure is ready for burial.

The band 12 about the cables is larger than the slots 65, 67 and serves as a stop to prevent pulling the cables from the enclosure. The continuously-curved walls at the outer end of the entrance passage permit pulling of the cables in opposite directions without adverse strain on the cables. The rectangular double wall construction achieved by the telescoping shells provides a relatively strong and durable enclosure which can resist substantial crushing forces.

I claim:

1. An enclosure for an electric cable splice, comprising:
    a first generally rectangular shell having a main section, an intermediate section and an entrance section; and
    a second generally rectangular shell having a main section, an intermediate section and an entrance section;
    with one of said shells sliding over the other of said shells bringing said main sections together to form a main compartment, said intermediate sections together to form an intermediate compartment, and said entrance sections together to form an entrance passage.

2. An enclosure as defined in claim 1 including a body of sealant in said main section of said first shell, and a body of sealant in said main section of said second shell.

3. An enclosure as defined in claim 2 with at least one of said shells having a barrier member between the main and intermediate sections thereof, with a slot in said barrier member for receiving spliced cables, with said slot providing a passage of reduced size between said main and intermediate sections.

4. An enclosure as defined in claim 3 with said shells having inter-engaging elements for holding said shells together.

5. An enclosure as defined in claim 4 wherein said inter-engaging elements include a first opening in a wall of one shell and a first boss in a wall of the other shell and positioned for entering said first opening when said shells are brought together.

6. An enclosure as defined in claim 4 wherein said inter-engaging elements include first and second spaced openings in walls of one shell and first and second spaced bosses in walls of the other shell, with said first boss positioned for entering said first opening when said shells are brought together to a first stage and with said second boss positioned for entering said second opening when said shells are brought together to a second stage.

7. An enclosure as defined in claim 4 wherein each of said entrance sections has opposed walls at the outer ends thereof diverging in continuous curves.

8. An enclosure as defined in claim 1 wherein said entrance passage is of a first cross-sectional area to receive a pair of cables, said intermediate compartment is of a second cross-sectional area larger than said first cross-sectional area, and said main compartment is of a third cross-sectional area larger than said second cross-sectional area, and with each of said shells having a barrier member between the main and intermediate sections thereof with a slot therein, with said barrier members overlapping when said shells are brought together so that said slots define an interior passage of substantially the same cross-sectional area as said first cross-sectional area of said entrance passage, and with said entrance passage and interior passage in alignment for positioning the pair of cables in said interior compartment spaced from the walls thereof.

9. An enclosure as defined in claim 8 including a body of sealant in the main section of said first shell, and a body of sealant in the main section of said second shell.

10. An enclosure as defined in claim 8 including a body of sealant in the main section of said first shell, and a body of sealant in the main section of said second shell, with the amount of said sealant in said main sections such that sealant is forced from said main compartment into said intermediate compartment when said shells are brought together.

11. An enclosure as defined in claim 9 with said shells having inter-engaging elements for holding said shells together.

12. An enclosure as defined in claim 10 wherein said inter-engaging elements include a first opening in a wall of one shell and a first boss in a wall of the other shell and positioned for entering said first opening when said shells are brought together.

13. An enclosure as defined in claim 10 wherein said inter-engaging elements include first and second spaced openings in walls of one shell and first and second spaced bosses in walls of the other shell, with said first boss positioned for entering said first opening when said shells are brought together to a first stage and with said second boss positioned for entering said second opening when said shells are brought together to a second stage.

14. An enclosure as defined in claim 10 wherein each of said entrance sections has opposed walls at the outer ends thereof diverging in continuous curves.

* * * * *